United States Patent [19]

Communal

[11] Patent Number: 5,171,453
[45] Date of Patent: Dec. 15, 1992

[54] WATER CLARIFICATION/PURIFICATION

[75] Inventor: Jean P. Communal, La Varenne Saint Hilaire, France

[73] Assignee: Rhone-Poulenc Chimie, Courbevoie, France

[21] Appl. No.: 728,801

[22] Filed: Jul. 11, 1991

Related U.S. Application Data

[63] Continuation of Ser. No. 374,571, Jul. 3, 1989, abandoned, which is a continuation of Ser. No. 98,890, Sep. 21, 1987, abandoned.

[30] Foreign Application Priority Data

Sep. 19, 1986 [FR] France ................................ 86 13109

[51] Int. Cl.$^5$ .................................................. C02F 1/52
[52] U.S. Cl. .................................... 210/726; 210/723
[58] Field of Search ............... 210/716, 717, 724, 726, 210/723

[56] References Cited

U.S. PATENT DOCUMENTS

| | | | |
|---|---|---|---|
| 3,929,666 | 12/1975 | Aiba et al. | 210/716 X |
| 4,051,028 | 9/1977 | Fiessinger | 210/716 |
| 4,284,611 | 8/1981 | Gancy et al. | 210/716 X |
| 4,362,643 | 12/1982 | Kuo et al. | 210/716 X |
| 4,402,851 | 9/1983 | Lindahl | 210/716 X |
| 4,485,018 | 11/1984 | Fiessinger et al. | 210/716 |
| 4,681,697 | 7/1987 | Doetsch et al. | 210/716 X |

FOREIGN PATENT DOCUMENTS

| | | |
|---|---|---|
| 0064252 | 11/1982 | European Pat. Off. . |
| 630631 | 12/1949 | United Kingdom . |
| 2056962 | 3/1981 | United Kingdom . |

Primary Examiner—Thomas Wyse
Attorney, Agent, or Firm—Burns, Doane, Swecker & Mathis

[57] ABSTRACT

Aqueous media, e.g., surface or waste waters, or industrial effluents, are clarified/purified, notably to markedly reduce the residual aluminum and organic solids contents thereof, by treating same, advantageously sequentially, with an effective impurity coagulating amount of at least one aluminum polymer and at least one ferric salt.

11 Claims, No Drawings

WATER CLARIFICATION/PURIFICATION

This application is a continuation of application Ser. No. 07/374,571, filed Jul. 3, 1989, abandoned, which is a continuation of application Ser. No. 098,890, filed Sep. 21, 1987, abandoned.

BACKGROUND OF THE INVENTION

1. Field of the Invention

The present invention relates to the treatment/-purification of aqueous media utilizing a particular coagulant, and, more especially, to such treatment utilizing a combination coagulant comprising an aluminum polymer and a ferric salt.

2. Description of the Prior Art

It is known to this art that the principal installations intended for the treatment of aqueous media (surface waters, effluents, residual waters, waste waters, etc.) essentially consist, on the one hand, of a gravity clarifier based on the principle of sedimentation, i.e., the elimination of solids in suspension in the water by gravity settling, and, on the other hand, by filtering means.

The settling basin thus contains, at the base thereof, a bed of sludge, and floating on the surface is a clarified liquid effluent which is removed by overflow.

It has also long been thought that the use of various coagulating agents capable of improving the conditions of sedimentation would enhance purification, and thus the quality of the waters treated.

Exemplary such coagulants include ferrous chloride, ferric chloride, ferrous sulfate, ferric sulfate, and ferric chlorosulfate.

Basic aluminum sulfates and, in particular, basic aluminum chlorosulfates, are also representative.

Most of these coagulants are indeed effective. Nevertheless, in recent times a need has arisen for a process providing lower and lower residual amounts of aluminum and organic materials in the waters treated, such as to satisfy increasingly severe hygienic and environmental standards. Need also exists for processes which are as flexible as possible, i.e., processes in which the ultimate quality of the treated water would be less dependent on the operation and construction of installations of this type.

For this purpose, the use of mixtures of iron and aluminum salts has been studied, for example by Johnson and Amirtharajah, featuring a mixture of ferric chloride and aluminum sulfate. Unfortunately, their studies lead to the conclusion that the use of such mixtures does not result in improved coagulation (see the Johnson and Amirtharajah article "Ferric Chloride And Alum As Single And Dual Coagulants", published in the May, 1984 issue of the *Journal of the American Water Works Association*.

SUMMARY OF THE INVENTION

Accordingly, a major object of the present invention is the provision of an improved process for the treatment of an aqueous phase which enables realization of very low residual amounts of aluminum.

A second object of the present invention is the provision of an improved process similarly enabling the realization of very low final amounts of organic material in the waters treated.

A third object of this invention is the provision of an improved process which makes it possible to treat aqueous media at higher pH values, while at the same time maintaining acceptable residual aluminum contents.

Briefly, the present invention features a process for the treatment of aqueous media by adding an effective impurity coagulating amount of at least one aluminum polymer and at least one ferric salt thereto.

DETAILED DESCRIPTION OF THE PREFERRED EMBODIMENTS OF THE INVENTION

More particularly according to the present invention, it has now unexpectedly and surprisingly been determined that the subject process provides not only very low residual aluminum contents in the treated waters, but also a significantly enhanced removal of organic matter. The process according to the invention also enables the treatment of aqueous media over an extended pH range, whereby its flexibility is concomitantly enhanced.

Without wishing to be bound to any particular theory, it would appear that the conjoint use of an aluminum polymer and a ferric salt makes it possible to limit the competitive coagulation/flocculation mechanisms known to the prior art with regard to mixtures of coagulating agents, and thus to attain an actual synergistic effect from the coagulating properties of each individual component.

The process according to the present invention is characterized by the fact that both an aluminum polymer and a ferric salt are conjointly used.

Exemplary of the aluminum polymers suitable for use according to this invention, particularly representative are the aluminum polysulfates, aluminum polychlorides, basic aluminum polychlorides and basic aluminum polychlorosulfates.

These aluminum polymers may either be used alone or in combination.

It will also be appreciated that the aforenoted aluminum polymers are only exemplary, and that all of the aluminum polymers known to this art are suitable for use in the present invention.

In a preferred embodiment of the invention, a basic aluminum polychlorosulfate is used. An example of a material particularly suitable for the present invention is described in published French Patent Application No. 85/10708, assigned to the assignee hereof. Such basic aluminum chlorosulfate is characterized in that it comprises a product of the following formula:

$$Al_nOH_m(SO_4)_kCl_{3n-m-2k}$$

wherein the basicity, or the $$\frac{m}{3n}$$

×100 ratio, ranges from about 40% to 65%, and in that it has a ratio of Al equivalents/Cl equivalents of from 2.8 to 5, an apparent molecular weight MA, measured by conventional light diffusion, and apparent hydrodynamic diameters $\phi Z$ and $\phi W$, measured by the quasi-elastic diffusion of light, having the following values:

MA = 7000–35000
$\phi Z$ (Å) = 350–2500
$\phi W$ (Å) = 200–1200.

More preferred are the basic aluminum polychlorosulfates described in the aforenoted French patent application, for which the basicity advantageously ranges from 40% to 60% and more particularly from 45% to 56% the Al equivalents/Cl equivalents ratio ranges from 3.2 to 4, the apparent molecular weight ranges from 22,000 to 32,000, and the hydrodynamic diameters $\phi(Z)$ and $\phi(W)$ respectively range from 1,500 to 2,200 and 800 to 1,100 Angstrom.

The process for the preparation of such compounds is also described in said French Application No. 85/10708.

The ferric salts to be utilized according to the present invention are compounds well known to this art. In contrast to the aforedescribed aluminum polymers, these are essentially monomer species. Exemplary such salts include ferric sulfate, ferric chloride and ferric chlorosulfate. These may also be used either alone or in combination.

In another preferred embodiment of the invention, ferric chlorosulfate is used.

Best results are obtained using a proportion of the iron salt constituting 10 to 30% by weight of the total amount of coagulants introduced. This makes it possible to maximally limit the competitive coagulation/flocculation, which may have the effect of increasing the proportion of residual aluminum and consumption of the reagents, and, in a more general manner, of interfering with the quality of flocculation.

It has also been determined that it may be especially advantageous to introduce the coagulating agents in a particular sequence. More particularly, it is preferred to first introduce the aluminum polymer into the aqueous medium, and after a certain delay in time, the ferric salt.

This "time delay" is defined as the time separating the instant of the introduction of the aluminum polymer and the instant of the introduction of the ferric salt.

Employing such a delay in time relative to the introduction of the coagulating agents makes it possible, in effect, to profit more efficaciously from the advantages of the mixed treatment.

It has thus also been found that an earlier introduction of the ferric salt could potentially initiate competition between the two coagulating agents detrimental to the overall treatment, while an excessively delayed introduction of the iron salt may interfere with the coagulation of the iron salt.

In any case, selection of an appropriate time delay will make it possible to avoid these potential difficulties. Typically, the time delay is less than the time required for the coagulation effected by the aluminum polymer when used alone.

Preferably, and in order to obtain better results, this time delay ranges from 0.6 to 9.9 times the time necessary for the coagulation provided by the aluminum polymer by itself, and even more preferably it ranges from 0.6 to 0.75 times this period, for example, in the case of a ferric chlorosulfate combined with an aluminum polymer such as described in French application No. 85/10708.

The total amount of coagulating agents to be introduced is not critical and may vary over wide limits, depending on the initial quality of the aqueous medium to be treated or the final quality desired for said medium. Typically, an amount of several tens of grams of these materials per m³ of the water being treated, is sufficient.

Utilizing the subject mixed treatment on an industrial scale results in an improvement relative to the lowering of the organic matter content of more than 10% and relative to the proportion of residual aluminum of more than 20% (with respect to the use of a basic aluminum polychlorosulfate alone). Finally, while it is generally necessary when using the products of the prior art to treat aqueous media at pH values of less than 8 to realize an acceptable residual aluminum content, this is not required with the process of the invention. This renders the subject process much more flexible.

In order to further illustrate the present invention and the advantages thereof, the following specific examples are given, it being understood that same are intended only as illustrative and in nowise limitative. In said examples to follow, the common operating conditions were:

1. The water treated was a raw water from the Oise River having the following characteristics:
   (i) temperature: 9.0° C.;
   (ii) pH: 7.89;
   (iii) hydrometric titer: 28°, French;
   (iv) turbidity: 12 NTU (HACH 2100);
   (v) organic matter content : 4.3 mg $O_2$/ (method of determination: permangante in an acid medium);

2. The jar-test experiments were conducted in the following manner:
   (i) 2-liter beaker;
   (ii) ambient temperature;
   (iii) pH control by adding either HCl or NaOH;
   (iv) the coagulants were added under rapid agitation at 180 rpm, and the time of agitation applied to each of the coagulants was the following:
   (a) addition of the aluminum polymer salt followed by 2 min, 45 sec, of rapid agitation;
   (b) after the elapse of the 2 min 45 sec, the monomeric ferric salt was added and rapid agitation was continued for 1 min 15 sec, such that the total time of rapid agitation was 4 min and corresponded to the optimum energy to be supplied in order to obtain good coagulation;
   (v) slow agitation: 20 min (50 rpm);
   (vi) decantation: 15 min;
   (vii) filtration on a nucleoporous filter of 0.4 μm;
   (viii) analysis of the aluminum content by atomic absorption in a Hewlett Packard apparatus.

3. The coagulating agents used were the following:
   (i) the aluminum polymer was a basic aluminum polychlorosulfate obtained according to the process of French application No. 85/10708; its basicity was 55%, its desulfatation proportion 82% and its $Al_2O_3$ content was 8.3%;
   (ii) the ferric salt was a ferric chlorosulfate $FeClSO_4$ having a density of 1.54 and an iron content of 200 g/l; this product is marketed under the trademark "CLAIRTAN" by Thann et Mulhouse.

EXAMPLE 1

This example illustrates determination of the optimum proportion of the coagulating agents to be used in the treatment of the aqueous phase.

The jar-test was conducted using increasing amounts of the aluminum polymer, from 5 to 30 g/m³ of the water treated, under the foregoing conditions.

The turbidity of the water, after settling for 15 min, was recorded and is reported in Table I:

TABLE I

| Amount of aluminum polymer g/m³ | Turbidity NTU (HACH 2100) |
| --- | --- |
| 5 | 10 |
| 10 | 5 |
| 15 | 1.6 |

TABLE I-continued

| Amount of aluminum polymer g/m³ | Turbidity NTU (HACH 2100) |
| --- | --- |
| 20 | 1.3 |
| 25 | 0.8 |
| 30 | 0.6 |

It was noted that the economically optimal proportion was determined to be about 20 g/m³ of the water treated.

This proportion of 20 g/m³ of the commercial product, with 8.3% of the active $Al_2O_3$, was therefore used in the following experiments.

EXAMPLE 2

This example illustrates determination of the effect of the time of the introduction of ferric salt into the aqueous medium undergoing treatment.

The abovedescribed water was treated with 20 ppm of coagulant, comprising 16 g/m³ aluminum polymer and 4 g/m³ ferric salt (this proportion was selected after preliminary screening experiments).

The total time of rapid agitation was 4 min and the time $t_1$ of the addition of the ferric salt was adjusted from 2 min, 15 sec, to 3 min, 30 sec, after the addition of the aluminum polymer. This rapid agitation time was considered equivalent to the time necessary for the coagulation effected by the aluminum polymer, as hereinbefore described.

The turbidity of the water decanted after 3 min, 15 sec, was observed, such as to determine the presence of microfloccules (decantation at 3 min) in the event of a possible competition between the iron salt and the aluminum salt that could be harmful to the quality of the decantation. The results are reported in Table II:

TABLE II

| Examples | Amount of aluminum polymer g/m³ | Amount of ferric salt g/m³ | $t_1$ | $K_f = t_1/$ time of total rapid agitation × 100 | NTU Turbidity 3 min | 15 min |
| --- | --- | --- | --- | --- | --- | --- |
| 1 | 20 | 0 | | | 1.60 | 1.30 |
| 2 | 16 | 4 | 2 min, 15 sec | 56 | 2.60 | 1.30 |
| 3 | 16 | 4 | 2 min, 30 sec | 62 | 2.50 | 1.25 |
| 4 | 16 | 4 | 2 min, 45 sec | 69 | 2.70 | 1.30 |
| 5 | 16 | 4 | 3 min | 75 | 5.20 | 1.45 |

It was noted that in the range of 56% < $K_f$ 21 70%, the presence of microfloccules, which translates into a turbidity of the water decanted at 3 min, was higher than in Control Experiment No. 1, but was nevertheless limited and remained compatible with the clarifiers presently in use; in fact, the turbidity of the water decanted at 15 min was normal, equivalent to that of the control.

It was thus found that when using total amount of 20 g/m³ of coagulating agents and a substitution of 20% by weight of the aluminum polymer by the ferric salt, best results were obtained with a time $t_1$ of from 55% to 75% of the total time permitted for the coagulation phase and more preferably from 60% to 70% of such time.

EXAMPLE 3

This example illustrates determination of the effect of the proportion of the substitution of the aluminum polymer by the ferric salt on the proportion of residual aluminum and the proportion of organic matter in the treated aqueous phase.

The time $t_1$ of the introduction of the ferric salt corresponded to 70% of the total time permitted for the coagulation phase.

The total amount of coagulating agents used was 20 g/m³ of the water treated.

The proportions of residual aluminum and organic matter were measured in water decanted after 15 min of treatment and filtered on a 0.4 μm microporous filter.

The results are reported in Table III:

TABLE III

| | Experiment | | | | | | |
| --- | --- | --- | --- | --- | --- | --- | --- |
| | A | B | C | D | E | F | G |
| Proportion of aluminum polymer | 20 | 17 | 15 | 14 | 10 | 6 | 0 |
| Proportion of ferric salt | 0 | 3 | 5 | 6 | 10 | 14 | 20 |
| % substitution by weight | 0 | 15 | 25 | 30 | 50 | 70 | 100 |
| Proportion of residual aluminum in μg/l | 140 | 110 | 110 | 100 | 75 | 60 | traces |
| Proportion of organic matter (MO) in mg $O_2$/l | 2.90 | 2.20 | 2.30 | 2.50 | 2.60 | 2.80 | 3 |
| Specific total consumption of coagulants per g of MO removed | 14.3 | 9.5 | 10 | 11.1 | 11.8 | 13.3 | 15.3 |

It will be seen that the proportion of residual aluminum was appreciably lower than in the treatment with the aluminum polymer alone, regardless of the range of substitution.

Furthermore, the level of residual organic matter was very significantly improved in the range of 15-50% of substitution, and more particularly in the range of 15-25%, together with the specific consumption of the coagulant. This latter feature constitutes an improvement in the quality of water produced under economic conditions, as it is known that the problems of taste that arise in water sterilized for distribution are directly related to the residual organic matter content (a problem associated with the taste characteristics of salt formers).

EXAMPLE 4

This example illustrates the effect of the pH of the water treated on the final residual aluminum content.

The total amount of coagulant was 20 ppm.

The proportion of substitution by the ferric salt was 17% and the time delay $t_1$ for the introduction of the ferric salt corresponded to 70% of the total time permitted for coagulation.

The results are reported in Table IV:

TABLE IV

| pH of the water treated | Aluminum content (ppb) of the water filtered on 0.4 μm nucleopore filter |
|---|---|
| 7.9 | 120 |
| 8 | 135 |
| 8.10 | 140 |
| 8.20 | 170 |
| 8.30 | 190 |

These values dramatically indicate that there exists an important operating safety factor relative to residual aluminum over a relatively broad pH range.

While the invention has been described in terms of various preferred embodiments, the skilled artisan will appreciate that various modifications, substitutions, missions, and changes may be made without departing from the spirit thereof. Accordingly, it is intended that the scope of the present invention be limited solely by the scope of the following claims, including equivalents thereof.

What is claimed is:

1. A process for the treatment of an impure aqueous medium containing organic impurities, comprising adding thereto an effective impurity coagulating amount of at least one aluminum polymer comprising an aluminum polysulfate, an aluminum polychloride, a basic aluminum polychloride or a basic aluminum polychlorosulfate and at least one ferric salt comprising a ferric sulfate, ferric chloride, or ferric chlorosulfate, said aluminum polymer and ferric salt being present in a relative proportion of 85–30% by weight of aluminum polymer and 15–70% by weight of ferric salt.

2. The process as defined by claim 1, wherein said at least one ferric salt is added at a delayed point in time, after addition of the at least one aluminum polymer, less than that required for completion of the coagulation effected by said at least one aluminum polymer.

3. The process as defined by claim 2, wherein said time delay ranges from 0.6 times to 0.9 times that period of time required for total coagulation by the at least one aluminum polymer.

4. The process as defined by claim 3, wherein said time delay ranges from 0.6 times to 0.75 times that period of time required for total coagulation by the at least one aluminum polymer.

5. The process as defined by claim 1, said at least one aluminum polymer comprising a basic aluminum polychlorosulfate.

6. The process as defined by claim 5, said basic aluminum polychlorosulfate having the formula:

$$Al_nOH_m(SO_4)_kCl_{3n-m-2k}$$

wherein the basicity, or the ratio $m/3n \times 100$ of which, ranges from approximately 40% to approximately 65%, and having an Al equivalents/Cl equivalents ratio of from 2.8 to 5, and apparent molecular weight MA and apparent hydrodynamic diameters $\phi Z$ and $\phi W$ as follows:

MA = 7,000 to 35,000;
$\phi Z$ (Å) = 350 to 2,500;
$\phi W$ (Å) = 200 to 1,200.

7. The process as defined by claim 6, wherein said basicity ranges from 40% to 60%, the Al equivalents/Cl equivalents ratio ranges from 3.2 to 4, and MA = 22,000 to 32,000;
$\phi Z$ (Å) = 1,500 to 2,200;
$\phi W$ (Å) = 800 to 1,100.

8. The process as defined by claim 1, said at least one ferric salt comprising a ferric chlorosulfate.

9. The process as defined by claim 1, wherein the total amount of added ferric salt comprises from 10% to 30% by weight of the total amount of added coagulants.

10. The process as defined by claim 1 wherein said aluminum polymer is a basic aluminum polychlorosulfate and wherein said ferric salt is a ferric chlorosulfate $FeClSO_4$.

11. A process for the treatment of an impure aqueous medium containing organic impurities, comprising adding thereto an effective impurity coagulating amount of at least one aluminum polymer comprising an aluminum polysulfate, an aluminum polychloride, a basic aluminum polychloride or a basic aluminum polychlorosulfate and at least one ferric salt comprising a ferric sulfate, ferric chloride, or ferric chlorosulfate.

* * * * *